(No Model.) 3 Sheets—Sheet 1.
J. W. THOMAS & A. R. LUDLOW.
SEEDING MACHINE AND CULTIVATOR.
No. 258,824. Patented May 30, 1882.
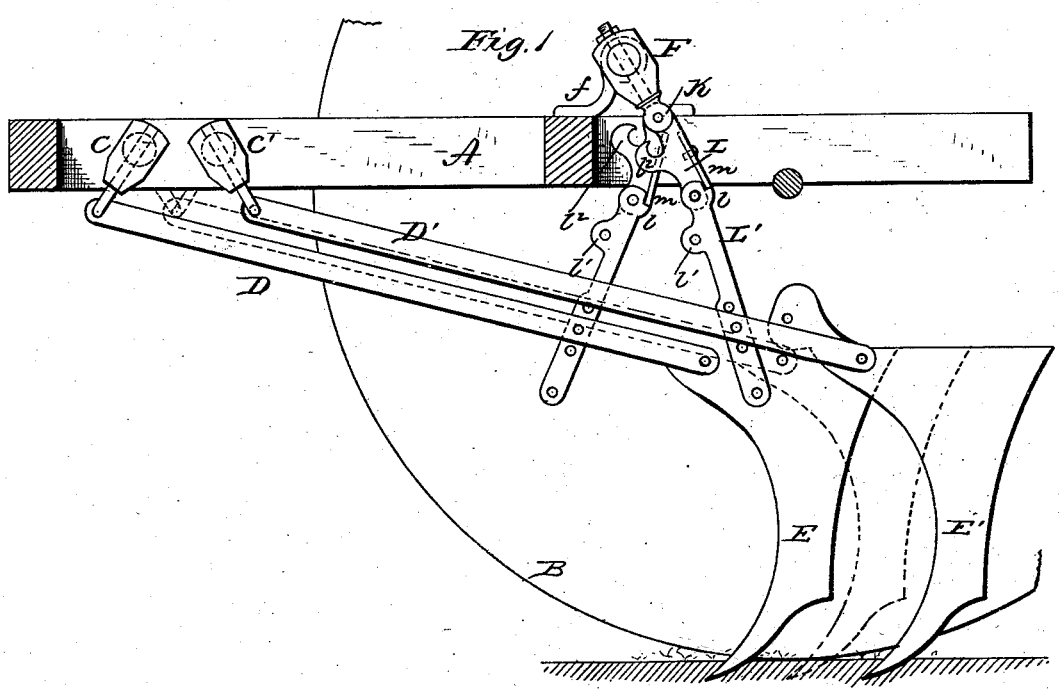
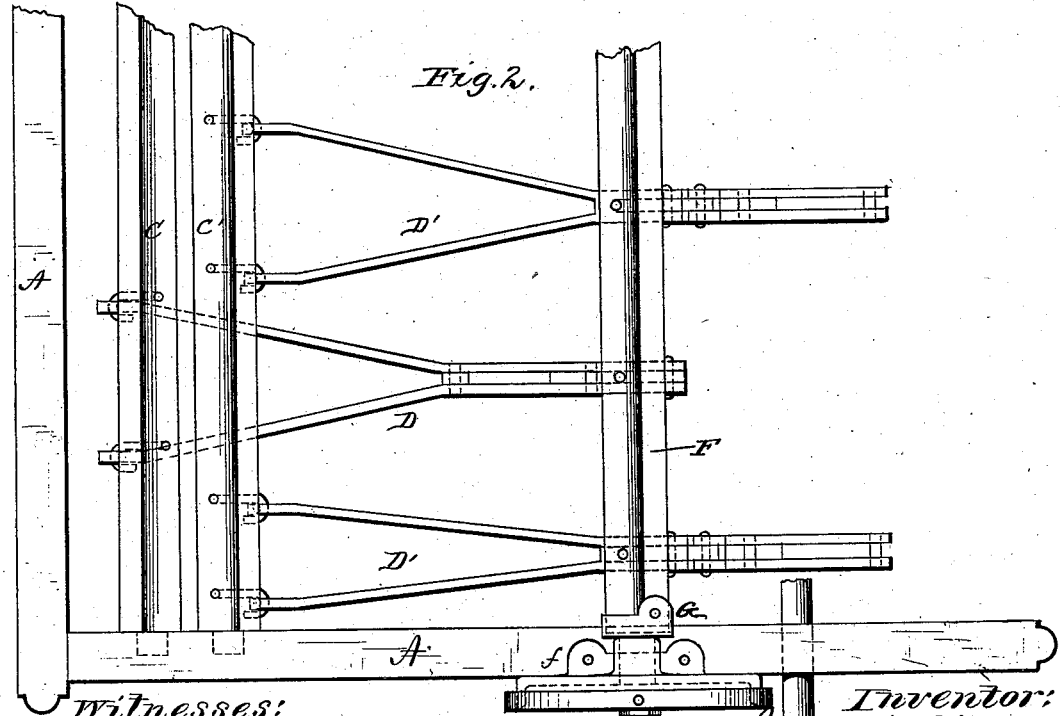

(No Model.) 3 Sheets—Sheet 2.
J. W. THOMAS & A. R. LUDLOW.
SEEDING MACHINE AND CULTIVATOR.
No. 258,824. Patented May 30, 1882.
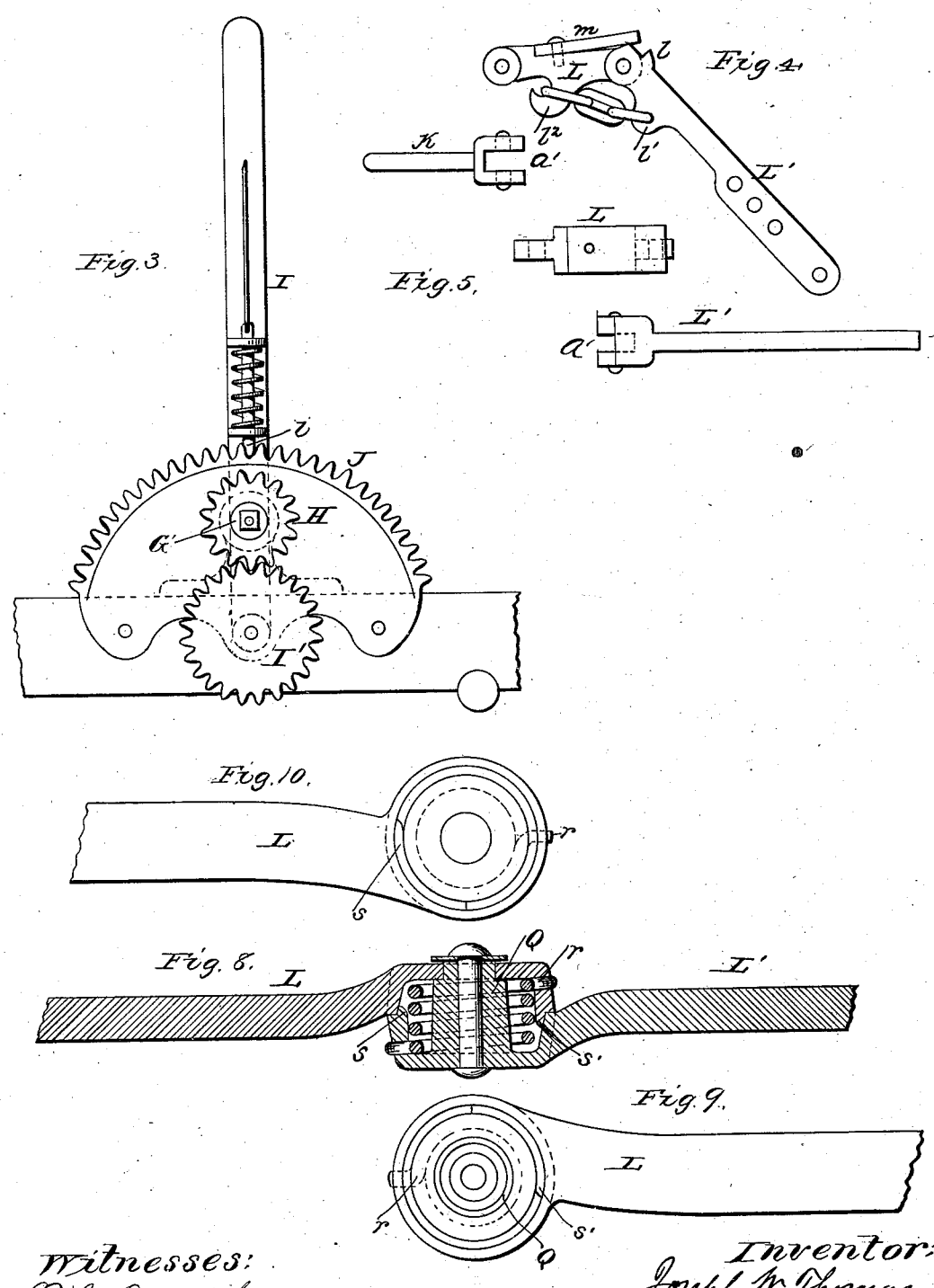
Witnesses:
F. L. Durand
R. M. Smith
Inventor:
Joseph W. Thomas
Abraham R. Ludlow
by A. M. Smith, atty.

(No Model.) 3 Sheets—Sheet 3.
J. W. THOMAS & A. R. LUDLOW.
SEEDING MACHINE AND CULTIVATOR.
No. 258,824. Patented May 30, 1882.
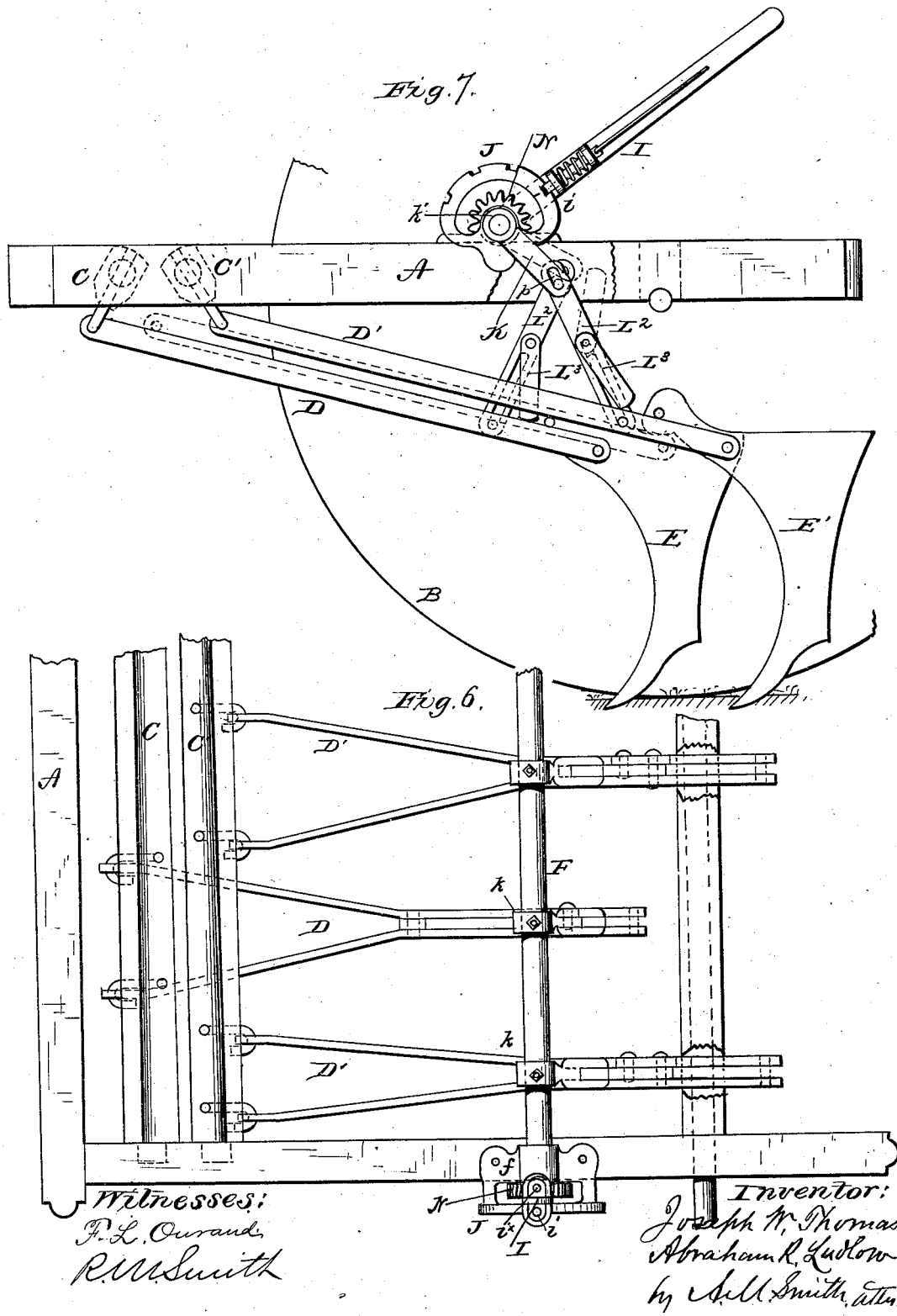
Witnesses:
F. L. Ourand
R. M. Smith
Inventor:
Joseph W. Thomas
Abraham R. Ludlow
by A. M. Smith, atty

UNITED STATES PATENT OFFICE.

JOSEPH W. THOMAS AND ABRAHAM R. LUDLOW, OF SPRINGFIELD, OHIO, ASSIGNORS TO THOMAS, LUDLOW & RODGERS, OF SAME PLACE.

SEEDING-MACHINE AND CULTIVATOR.

SPECIFICATION forming part of Letters Patent No. 258,824, dated May 30, 1882.

Application filed January 9, 1882. (No model.)

*To all whom it may concern:*

Be it known that we, JOSEPH W. THOMAS and ABRAHAM R. LUDLOW, of Springfield, county of Clarke, and State of Ohio, have invented certain new and useful Improvements in seeding-machines and cultivators for applying pressure on the hoes or teeth, and also for raising them, of which the following is a specification.

We employ a rocking cross-bar operated by a lever properly geared, so as to give the bar a rolling or rotating movement by throwing the lever forward or backward. This cross-bar extends crosswise of the machine the full width of the space cultivated, and is provided with suitable bearings at the ends, located on the main frame of the machine, and is adapted to raise, lower, and keep in any required position all of the hoes or teeth at a uniform height or depth, whether in or out of the ground, or whether in one or two ranks. To this rotating cross-bar is attached, by eyebolts or other suitable device, a series of automatic pressure or connecting rods. The other ends of these rods are attached to the drag-bars, hoes, or teeth. In the drawings the lower ends of the rods are shown as connected to draw-bars; but they may be attached directly to the hoes or teeth. These pressure or connecting rods are for applying a positive pressure to the hoes or teeth, as well as for raising them out of the ground, and are so constructed with joints and springs that when the hoes or teeth are lowered into the ground the rods become stiff or rigid from the points of attachment on the cross-bar to the point of attachment to the drag-bars, hoes, or teeth, so that by rotating the cross-bar, to which the upper ends of the rods are attached, a pressure of the whole weight of the machine may be applied to the hoes or teeth for holding them in the ground at any depth required, or for raising them entirely out of the ground for transporting the machine. These automatic pressure-rods are constructed with self-operating locking joints between the point of attachment to the rotating cross-bar and the draw-bars, hoes, or teeth, so that when the hoes or teeth are lowered into the ground the joints lock and make the rods rigid or stiff, and the hoes or teeth may be held at any depth, and cannot rise until the lock-joints are loosened and the rods allowed thereby to partly fold up, or until the lever for operating them is moved. These lock-joints are also for the purpose of allowing the pressure-rods to partly fold when desired, so that the operator can at will raise one or more of the hoes or teeth of the machine without disturbing or releasing the pressure from any of the others, and without moving the lever which operates the rotating cross-bar, simply by unlocking the joint and lifting the hoe or tooth desired, and when the hoe or tooth is again lowered the joint will lock, as before, and make the pressure-rod rigid. These joints also yield when the hoes or teeth are raised, so as to allow the rods to accommodate themselves to the rotating movement of the cross-bar to prevent binding or straining of the parts. These lock-joints are provided with means adapting them, when desired, to be used as loose joints, and allow the pressure-rods to fold free from any pressure whatever, permitting the hoes or teeth to rise and fall to accommodate themselves to any unevenness in the surface of the soil, in the same manner as if a chain were used. These lock-joints are further so constructed than when the pressure-rods are used rigid to apply pressure to the hoes or teeth they will hold them at any depth to which they are set, unless there should be hard places in the ground of such a character that unless the pressure-rods could yield and allow the hoes or teeth to rise the wheels of the machine would be raised from the ground. In such cases the lock-joints will yield and allow the hoes or teeth to rise before lifting the machine from the ground. These lock-joints may be also so constructed that they cannot yield to any pressure. The lever for operating the rotating cross-bar for raising, lowering, and holding the hoes or teeth in any position works on a stud at the end of the machine, and has a gear attached at the lower end, which engages a gear attached to the end of the rotating cross-bar, and when the lever is moved forward or backward the cross-bar rotates and the hoes or teeth are raised and lowered. The lever is provided with a spring-latch, which operates in a ratchet-arch, so that when moving the lever it is held in any position by this spring-latch engaging the teeth of the ratchet-arch.

To enable those skilled in the art to understand how to construct and use our invention, we will proceed to describe the same with reference to the drawings, in which—

Figure 1 represents a vertical longitudinal section through a portion of a seeding-machine, showing our improvements. Fig. 2 is a partial plan view of the same. Fig. 3 is a side elevation, showing the arrangement of lever and gears for operating the rocking bar and hoes or teeth and holding devices. Fig. 4 is a side elevation of the jointed pressure or connecting rod detached, and Fig. 5 is a plan view of the separate parts of said rod and the means for connecting it to the rocking bar. Fig. 6 is a partial plan or top view, and Fig. 7 is a partial side elevation, showing a modification in the construction of the jointed pressure-rod and some of the other parts; and Figs. 8, 9, and 10 are detail views, showing still another modification in the construction of the pressure-rods.

A represents the frame of the machine; B, one of the carrying and driving wheels; C C', rocking bars, to which the draw-bars D D' are attached; and E E' the hoes or teeth, said parts, being constructed and arranged in any usual or preferred manner, that shown being similar to grain-drills in common use for adapting the hoes to be set either in a single row or in a zigzag position or double row.

F is a transverse rock-shaft or bar, mounted in suitable bearing-brackets, $f$, on the side bars of the frame A, said bar being made in any suitable form, either round or polygonal, and of any suitable material. Where made of wood it is provided with metal end plates, G, or ferrules having the journals G' formed thereon, one of which is provided with a pinion, H, made fast to said journal, for operating the bar F.

I is a lever pivoted on a stud-pin of the ratchet-arch or other suitable point of support in frame A, and provided with a gear-wheel, I', surrounding its pivot and engaging with the pinion H for actuating it and the bar F. The lever I is provided with a spring latch or pawl, $i$, which engages with the ratchet-arch J for holding the lever I at any desired adjustment. The latch $i$ in practice is connected with a thumb-lever so arranged that when the attendant grasps the lever I for vibrating it he will at the same time grasp the thumb-lever and release the latch. Where a wooden bar, F, is employed, as shown in Figs. 1 and 2, said bar is perforated at suitable intervals to receive a series of eyebolts, K, adjustably secured in the bar, and forming crank-arms forked at their outer ends, $a'$, (see Fig. 5,) to which one end of a jointed pressure-rod or connecting-rod, L L', is pivoted, the lower or opposite end of said jointed rod being pivoted to the draw-bar D or D', or to the hoe or tooth connected therewith. The joint in the rod L L' is made in the form of a butt-hinge, the part L being by preference recessed to receive or having a flat spring, $m$, secured to its upper face, said spring overlapping the adjacent end of the part L', and the latter is provided with a shoulder or offset at $l$, against which the end of the spring $m$ abuts, locking the joint and making the jointed rod stiff and unyielding in one direction. The arrangement is such that when the joint is made rigid the parts L L' will be deflected slightly from a right line, adapting the joint to yield to a very heavy pressure. The lower end of the rod or part L' thereof is slotted or provided with a series of perforations, permitting it to be adjusted relatively to the drag-bars or hoes or teeth for adapting the latter to be set to work and to be held at any required depth.

Where it is not desired to lock the joint in the rods L L' short chains may be used, engaging with hooks or an eye, $l'$, and hook $l^2$ on the inner or lower faces of the parts for holding them deflected, as shown in Fig. 4, adapting the joint to more readily yield or flex to accommodate the rising of the hoes or teeth in passing over obstructions. Under this arrangement of the jointed rods it will be seen that the hoes or teeth may be held to the ground with any required pressure. Where no pressure is required beyond what is due to the weight of the hoes or teeth themselves, the lock-joints of the pressure-rods may be used loosely, or chains may be substituted in place of the jointed rods L L'.

In Figs. 6 and 7 a modification in some of the parts is shown. Thus the lever I, instead of being geared to the rocking bar or shaft F, is pivoted directly upon said shaft, or on its journal. It is provided with a spring pawl or latch engaging with the ratchet-arch, and with a second similar latch, $i^x$, engaging a pinion, N, through which it is connected with the shaft for rocking it. By this arrangement, when the lever is released from the shaft all pressure is removed from the hoes or teeth, and they are left free to rise and fall to conform to the surface of the ground over which they are drawn. The shaft F in this construction is of metal, and is made round, and the crank-arms K are provided with sleeves $k'$, adapted to be slipped on said shaft and held at the desired points by set-screws or other suitable fastening device. The outer ends of these arms have the rods L² pivoted to them through a slot at $p$, permitting a slight relative movement, and said link L² is slotted at its lower end, where it is pivoted to the drag-bar, tooth, or hoe, for permitting the connecting pin or bolt to rise or fall or be adjusted therein. A dog or latch, L³, is pivoted to the rod L², its lower end resting upon the drag-bar or hoe, and serving to prevent the connecting-pin from rising in the slot, and locking the hoes or teeth down to their work.

In Figs. 8, 9, and 10 still another construction of the jointed pressure-rod is shown, Fig.

8 showing a section through the joint, and Figs. 9 and 10 inner face views of the two parts thereof. One of the parts is provided with a trunnion surrounded by a circular flange, and the other is perforated and fits on said trunnion, having a similar circular flange. Within the cup or shell formed by the flanges is a spring, r, coiled around the trunnion Q, one end of said spring engaging with the arm or part L and the other with the part L' through perforations in the shell or flange, or in any other suitable manner.

s s' are lugs or projections on the inner faces of the flanges, overlapping their adjoining edges, and serving, by abutting one against the other, to lock the parts against movement beyond the position as shown in Fig. 1, the tension of the spring r acting to hold them in said position. Other forms or constructions of the joint might be shown; but these are sufficient to show how our invention may be carried out in practice.

By the arrangement of the jointed pressure or connecting rods, in connection with the rock-shaft described, we are enabled to hold the hoes or teeth to their work at any desired depth, and with the whole weight of the machine, if necessary, while by means of the jointed rods, any one of which can be flexed independently of the others, any one or more of the hoes can be released and raised for passing an obstruction, or for other purpose, without disturbing the others, and at the same time said hoe or tooth, when released or after it has passed an obstruction, will again be automatically locked in working position by means of its jointed rod. The rock-shaft actuating the jointed pressure-rods is located over the rear ends of the drag-bars, or thereabout, when the hoes or teeth are adjusted to a single rank, adapting it to act uniformly on the hoes or teeth for raising or lowering them, whether the latter are in single or in double rank. When the hoes or teeth are raised the part L of the jointed pressure-rods connected with the crank-arms on the rock-shaft will move over the shaft, causing the jointed rod to partly wrap itself around the shaft, thereby preventing binding or cramping of the joints therein.

Parts of the machine not particularly described may be constructed in any usual or preferred way.

Having now described our improvements in seeding-machines and cultivators, what we claim as new is—

1. The combination, with a hoe or tooth and a lifting roller or shaft for raising and lowering the same, of a jointed pressure-rod hinged to said shaft and provided with a shouldered or locking joint, substantially as and for purpose described.

2. The combination of the hoe or tooth, the rock-shaft for raising and lowering the same, a jointed pressure-rod interposed between said tooth and rock-shaft, and having a shouldered or locking joint, and a spring arranged to exert its tension to straighten said jointed rod.

3. The combination of the hoes or teeth, the lifting roller or shaft for raising and lowering the same, the jointed rods connecting said teeth and shaft hinged to the latter, and having shouldered or locking joints, and means for locking said shaft, whereby the hoes or teeth may be held locked in working position, while at the same time any one tooth is adapted to rise without disturbing the others or the lifting roller or shaft.

4. The combination of the hoes or teeth, the lifting roller or shaft for raising and lowering the same, the jointed pressure-rods connecting said teeth and shaft and having a hinged or pivotal connection with the latter, and a lever geared to said shaft for actuating it.

5. The combination of the hoes or teeth, a lifting roller or shaft connected therewith by jointed pressure-rods and provided with a toothed wheel, a lever geared thereto for actuating it, and means for holding said lever at any desired adjustment.

6. A jointed pressure-rod for connecting the hoes or teeth and the rock-shaft, adapted to be hinged to the latter, and provided with the shouldered or locking joints, in combination with the distending springs, substantially as described.

7. The jointed pressure-rods connecting the hoes or teeth and the rock-shaft, hinged to the latter, and provided with shouldered or locking joints, distending springs, and slots permitting the hoes or teeth to fall and rise within certain limits each independently of the others, substantially as described.

8. The jointed and folding pressure-rods connecting the hoes or teeth and the lifting roller or shaft, and having a pivotal connection with the latter, said jointed rods having slots permitting the independent movement of the teeth, perforations and set-screws or bolts adapting them to hold the teeth at any desired adjustment, and self-locking or shouldered joints, in combination with springs applied and operating substantially as described.

9. The jointed and folding pressure-rods connecting the hoes or teeth with the lifting-roller, provided with shouldered or self-locking joints, in combination with distending springs, and means for holding said joints flexed, substantially as described.

10. The combination, with the hoes or teeth and adjustable drag-bars for changing said teeth from a straight line or single row to a zigzag position, and vice versa, of a lifting-roller hinged to the latter, and provided with shouldered or self-locking joints, substantially as and for the purpose described.

JOSEPH W. THOMAS.
     ABRAHAM R. LUDLOW.

Witnesses:
 A. P. LINN COCHRAN,
 ROBT. C. RODGERS.